United States Patent [19]
Kikuchi

[11] Patent Number: 4,572,620
[45] Date of Patent: Feb. 25, 1986

[54] ZOOM LENS SYSTEM

[75] Inventor: Juro Kikuchi, Tokyo, Japan

[73] Assignee: Olympus Optical Co., Ltd., Tokyo, Japan

[21] Appl. No.: 521,821

[22] Filed: Aug. 10, 1983

[30] Foreign Application Priority Data

Aug. 16, 1982 [JP] Japan ............... 57-141095

[51] Int. Cl.⁴ .............................. G02B 15/00
[52] U.S. Cl. ...................... 350/427; 350/423; 350/432
[58] Field of Search ................... 350/427, 423

[56] References Cited

U.S. PATENT DOCUMENTS 3,972,592  8/1976  Ruben .................... 350/423
3,997,244  12/1976  Takano .................... 350/427
4,281,906  8/1981  Tanaka .

FOREIGN PATENT DOCUMENTS

56-57018  5/1981  Japan .
57-27219  2/1982  Japan .
57-53718  3/1982  Japan .

*Primary Examiner*—John K. Corbin
*Assistant Examiner*—P. M. Dzierzynski
*Attorney, Agent, or Firm*—Cushman, Darby & Cushman

[57] ABSTRACT

A zoom lens system comprising a first lens group having positive refractive power, a second lens group having negative refractive power, a third lens group having negative refractive power and a fourth lens group having positive refractive power, the zoom lens system being arranged to be zoomed by moving the second and third lens groups, at least one lens element in the fourth lens group being arranged as a plastic lens, the zoom lens system being thereby arranged to be small in size, light in weight and low in price and, at the same time, to have high performance.

16 Claims, 13 Drawing Figures

ZOOM LENS SYSTEM

BACKGROUND OF THE INVENTION (a) Field of the Invention

The present invention relates to a zoom lens system and, more particularly, to a zoom lens system to be used with a home video camera or the like which has a large aperture and covers the range of focal lengths used frequently.

(b) Description of the Prior Art

There are known zoom lens systems comprising four lens groups in which two movable lens groups are arranged between fixed lens groups and those movable lens groups are moved independently of each other for the purpose of zooming.

Such known zoom lens systems for home video cameras generally have performances higher than those of image pickup tubes and tape decks and, therefore, they are satisfactory as far as the performance is concerned.

However, in case of known zoom lens systems for home video cameras, the number of lenses constituting the lens system is large, magnification is high and aperture is large. Consequently, the front lens diameter is large and overall length of the lens system is long. This means that it is difficult to make the camera as a whole small in size, light in weight and low in price.

Known zoom lens systems for home video cameras are disclosed, for example, in Japanese published unexamined patent applications Nos. 53718/82 and 27219/82. In case of the former zoom lens system out of the above, the aperture ratio is small, i.e., F/1.8 and, moreover, the overall length is long, i.e., $2f_T$ (reference symbol $f_T$ represents the focal length of the lens system as a whole in the teleposition). In this zoom lens system, all lenses constituting the first lens group out of four lens groups are arranged as plastic lenses in order to make the lens system light in weight. However, the overall length is comparatively long as described in the above and, therefore, the lens system is not compact. Moreover, to make the lens system still lighter in weight and to reduce the cost of manufacture, it is necessary to increase the number of plastic lenses, and it is desirable to use plastic lenses also in other lens goups.

The latter zoom lens system employs a lens formed by fixing a thin plastic film with an aspherical surface onto a glass lens in order to improve the performance. However, in case of this zoom lens system, the aperture ratio is F/1.6 and zoom ratio is 3. Therefore, it cannot be said that it is a high performance zoom lens system.

Japanese published unexamined patent application No. 147133/81 also discloses a zoom lens system. Though this zoom lens system employs a lens with an aspherical surface, its aperture ratio is F/1.6 and zoom ratio is 3. Therefore, the performance of this zoom lens system is not so high.

Japanese published unexamined patent application No. 57018/81 also discloses a zoom lens system. This zoom lens system employs a glass lens having an aspherical surface and its zoom ratio is 8. However, its aperture ratio is F/1.8, and this is too small as the aperture ratio of zoom lens systems to be used with ⅔ inch image pickup tubes which are popular in these days.

SUMMARY OF THE INVENTION

It is, therefore, a primary object of the present invention to provide a zoom lens system which is arranged to be small in size, light in weight and low in price by adopting plastic lenses and, at the same time, which has satisfactory performance as a zoom lens system for home video cameras.

The zoom lens system according to the present invention comprises a first lens group I having positive refractive power, a second lens group II having negative refractive power, a third lens group III having negative refractive power and a fourth lens group IV having positive refractive power, in the order from the object side, and is arranged to vary the magnification by moving the second lens group II and the third lens group III, the zoom lens system according to the present invention being arranged to be light in weight and low in price by using plastic lenses as several lens elements in respective lens groups except the second lens group II.

However, optical materials of plastics available at present are very limited in kind and, out of them, materials which are optically, physically and chemically stable are still more limited. Therefore, the degree of freedom in the design of lens systems is considerably low.

In the present invention, plastic lenses are adopted for lens elements with small refractive powers so that, even when the degree of freedom in the design is reduced by the use of plastic lenses, the influence on correction of aberrations becomes small and, therefore, aberrations of the zoom lens system as a whole can be corrected favourably. When plastic lenses are adopted for lens elements with small refractive powers as described in the above, it is possible to arrange a larger number of lens elements in the lens system as plastic lenses, without decreasing the performance of the zoom lens system as a whole, by adopting plastic lenses for adequate lens elements in the lens groups other than the second lens group II. Thus, it is possible to obtain a zoom lens system which has high performance and, at the same time, which is light in weight and low in price.

Especially, for the fourth lens group IV, it is possible to centralize most of the refractive power upon some of lens elements therein and to make the refractive powers of the other lens elements small. Moreover, when an aspherical surface is adopted for a lens element of which the refractive power is made large, it is possible to arrange that the aspherical surface serves to supress aberrations, which might be otherwise caused by the fact that the refractive power thereof is made larger.

As described in the above, the present invention enables one to obtain a zoom lens system with favourable performance which is light in weight and low in price by arranging that the refractive power is centralized upon some of lens elements so as to thereby make the refractive powers of the other lens elements weak in order to thereby make it possible to use plastic lenses and, at the same time, by adopting an aspherical surface as required so that said aspherical surface enables one to prevent aggravation of aberrations which will be otherwise caused due to the fact that the refractive power is centralized upon some of lens elements. It is also possible to arrange the lens element with the aspherical surface as a plastic lens. In that case, as the aspherical surface is adopted for the lens element made of a material which can be machined easily, the manufacture becomes very easy compared with the case that a glass lens is arranged to have an aspherical surface.

Figure 1:
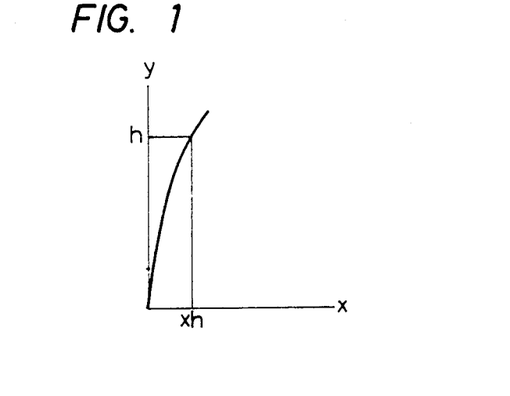
FIG. 1 shows the shape of the aspherical surface.

The aspherical surface described in the above is expressed by the formula shown below where the optical axis is represented by x axis and direction at a right angle to the optical axis is represented by y axis as shown in FIG. 1, reference symbol r represents the radius of curvature of the vertex portion of said aspherical surface, reference symbol h represents the height from the optical axis, reference symbol p represents a coefficient of cone, and reference symbol Cij represents the coefficient of aspherical surface on ith surface.

$$x_h = \frac{\frac{h^2}{r}}{1 + \sqrt{1 - p\frac{h^2}{r^2}}} + C_{ij}\left(\frac{h}{r}\right)^j$$

In the formula shown in the above, the first term determines the basic shape of the aspherical surface (an ellipsoid of revolution, paraboloid of revolution, etc.).

When the aspherical surface used in the present invention is adopted for a surface convex toward the object side, it is possible to correct spherical aberration etc., which is caused by the afore-mentioned lens elements upon which the refracitve power centralized, by arranging p in the formula shown in the above as $p \leq 1$, i.e., by forming the aspherical surface as an ellipsoid of revolution. Besides, to correct positive spherical aberration etc. caused by other lens elements, it is necessary to arrange as $p > 0.5$.

When a surface convex toward the image side is formed as an aspherical surface in the present invention, it is necessary to arrange as $p \leq 1$, i.e., to form the aspherical surface as a hyperboloid of revolution, due to the same reason described in the above. In that case, it is necessary to arrange as $p < 2$ in order to correct positive spherical aberration etc. caused at other lens surfaces.

The aspherical surface is capable of correcting aberrations even when it is formed to have a shape expressed only by the first term of the formula shown in the above (terms of higher orders expressed by the second term are all zero). However, when the aspherical surface is formed to have a shape expressed by the formula having the terms of higher orders, it is possible to correct aberrations more finely.

PREFERRED EMBODIMENTS OF THE PRESENT INVENTION

Now, preferred embodiments of the zoom lens system according to the present invention are shown below.

Embodiment 1
$r_1 = 163.4077$
$d_1 = 1.5$, $n_1 = 1.78472$, $\nu_1 = 25.68$
$r_2 = 48.4737$
$d_2 = 1$
$r_3 = 49.3624$
$d_3 = 9.3$, $n_2 = 1.62041$, $\nu_2 = 60.27$
$r_4 = -111.7425$
$d_4 = 0.1$
$r_5 = 36.1884$
$d_5 = 6.4$, $n_3 = 1.6968$, $\nu_3 = 55.52$
$r_6 = 82.5047$
$d_6 = l_1$ (variable)
$r_7 = 97.862$
$d_7 = 1$, $n_4 = 1.6968$, $\nu_4 = 55.52$
$r_8 = 15.26$
$d_8 = 4.5$
$r_9 = -21.833$
$d_9 = 1$, $n_5 = 1.7725$, $\nu_5 = 49.66$
$r_{10} = 20.759$
$d_{10} = 4.5$, $n_6 = 1.84666$, $\nu_6 = 23.88$
$r_{11} = -299.975$
$d_{11} = l_2$ (variable)
$r_{12} = -31.021$
$d_{12} = 1.5$, $n_7 = 1.62041$, $\nu_7 = 60.27$
$r_{13} = \infty$
$d_{13} = l_3$ (variable)
$r_{14} = -183$
$d_{14} = 3$, $n_8 = 1.62041$, $\nu_8 = 60.27$
$r_{15} = -34.708$
$d_{15} = 0.1$
$r_{16} = 197.059$
$d_{16} = 4$, $n_9 = 1.617$, $\nu_9 = 62.79$
$r_{17} = -47.202$
$d_{17} = 4$
$r_{18} = 150.0626$
$d_{18} = 3.54$, $n_{10} = 1.49216$, $\nu_{10} = 57.5$
$r_{19} = -93.0622$
$d_{19} = 0.1$
$r_{20} = 16.0266$ (aspherical surface)
$d_{20} = 6.5$, $n_{11} = 1.49216$, $\nu_{11} = 57.5$
$r_{21} = \infty$
$d_{21} = 1.04$
$r_{22} = -242.654$
$d_{22} = 2.09$, $n_{12} = 1.84666$, $\nu_{12} = 23.88$
$r_{23} = 28.103$
$d_{23} = 6.36$
$r_{24} = 28.457$
$d_{24} = 2.8$, $n_{13} = 1.80610$, $\nu_{13} = 40.95$
$r_{25} = 56.333$
$d_{25} = 1.78$
$r_{26} = 16.743$
$d_{26} = 2$, $n_{14} = 1.80518$, $\nu_{14} = 25.43$
$r_{27} = 10.169$
$d_{27} = 9$
$r_{28} = 15.319$
$d_{28} = 5$, $n_{15} = 1.617$, $\nu_{15} = 62.79$
$r_{29} = -141.112$
$d_{29} = 0.26$
$r_{30} = \infty$
$d_{30} = 3.1$, $n_{16} = 1.51633$, $\nu_{16} = 64.15$
$r_{31} = \infty$
$d_{31} = 0.05$
$r_{32} = \infty$
$d_{32} = 3.4$, $n_{17} = 1.45875$, $\nu_{17} = 67.8$
$r_{33} = \infty$

| $f = 12.42 \sim 69.46$ | | | |
|---|---|---|---|
| f | 12.42 | 30 | 69.46 |
| $l_1$ | 1.353 | 17.740 | 27.135 |
| $l_2$ | 28.431 | 8.774 | 4.242 |
| $l_3$ | 2.877 | 6.147 | 1.284 |

$p = 0.8792$ (twentieth surface)

Embodiment 2
$r_1 = 163.4077$
$d_1 = 1.5$, $n_1 = 1.78472$, $\nu_1 = 25.68$
$r_2 = 48.4737$
$d_2 = 1$
$r_3 = 49.3624$
$d_3 = 9.3$, $n_2 = 1.62041$, $\nu_2 = 60.27$
$r_4 = -111.7425$
$d_4 = 0.1$
$r_5 = 36.1884$
$d_5 = 6.4$, $n_3 = 1.6968$, $\nu_3 = 55.52$
$r_6 = 82.5047$ -continued

| | | |
|---|---|---|
| $d_6 = l_1$ (variable) | | |
| $r_7 = 97.862$ | | |
| $d_7 = 1$ | $n_4 = 1.6968$ | $\nu_4 = 55.52$ |
| $r_8 = 15.26$ | | |
| $d_8 = 4.5$ | | |
| $r_9 = -21.833$ | | |
| $d_9 = 1$ | $n_5 = 1.7725$ | $\nu_5 = 49.66$ |
| $r_{10} = 20.759$ | | |
| $d_{10} = 4.5$ | $n_6 = 1.84666$ | $\nu_6 = 23.88$ |
| $r_{11} = -299.975$ | | |
| $d_{11} = l_2$ (variable) | | |
| $r_{12} = -31.021$ | | |
| $d_{12} = 1.5$ | $n_7 = 1.62041$ | $\nu_7 = 60.27$ |
| $r_{13} = \infty$ | | |
| $d_{13} = l_3$ (variable) | | |
| $r_{14} = -217.555$ | | |
| $d_{14} = 3$ | $n_8 = 1.49216$ | $\nu_8 = 57.5$ |
| $r_{15} = -29.1151$ | | |
| $d_{15} = 0.1$ | | |
| $r_{16} = 114.5486$ | | |
| $d_{16} = 4$ | $n_9 = 1.497$ | $\nu_9 = 81.61$ |
| $r_{17} = -42.1253$ | | |
| $d_{17} = 4$ | | |
| $r_{18} = 19.1046$ | | |
| $d_{18} = 6.2$ | $n_{10} = 1.6968$ | $\nu_{10} = 56.49$ |
| $r_{19} = 327.6174$ | | |
| $d_{19} = 0.1$ | | |
| $r_{20} = 16.0450$ | | |
| $d_{20} = 4$ | $n_{11} = 1.49216$ | $\nu_{11} = 57.5$ |
| $r_{21} = 32.1306$ | | |
| $d_{21} = 1.47$ | | |
| $r_{22} = -218.0205$ | | |
| $d_{22} = 2.09$ | $n_{12} = 1.80518$ | $\nu_{12} = 25.43$ |
| $r_{23} = 13.4794$ | | |
| $d_{23} = 6.58$ | | |
| $r_{24} = 17.3486$ | | |
| $d_{24} = 4.08$ | $n_{13} = 1.80518$ | $\nu_{13} = 25.43$ |
| $r_{25} = 10.7330$ | | |
| $d_{25} = 4.97$ | | |
| $r_{26} = 15.5448$ | | |
| $d_{26} = 4$ | $n_{14} = 1.62041$ | $\nu_{14} = 60.27$ |
| $r_{27} = 70.52$ | | |
| $d_{27} = 2.34$ | | |
| $r_{28} = 15.5188$ | | |
| $d_{28} = 3.7$ | $n_{15} = 1.62041$ | $\nu_{15} = 60.27$ |
| $r_{29} = 283.9027$ | | |
| $d_{29} = 0.26$ | | |
| $r_{30} = \infty$ | | |
| $d_{30} = 3.1$ | $n_{16} = 1.51633$ | $\nu_{16} = 64.15$ |
| $r_{31} = \infty$ | | |
| $d_{31} = 0.05$ | | |
| $r_{32} = \infty$ | | |
| $d_{32} = 3.4$ | $n_{17} = 1.45875$ | $\nu_{17} = 67.8$ |
| $r_{33} = \infty$ | | |

$f = 12.42 \sim 69.46$

| f | 12.42 | 30 | 69.46 |
|---|---|---|---|
| $l_1$ | 1.353 | 17.740 | 27.135 |
| $l_2$ | 28.431 | 8.774 | 4.242 |
| $l_3$ | 2.797 | 6.067 | 1.203 |

Embodiment 3

| | | |
|---|---|---|
| $r_1 = 175.465$ | | |
| $d_1 = 1.5$ | $n_1 = 1.78472$ | $\nu_1 = 25.68$ |
| $r_2 = 47.104$ | | |
| $d_2 = 8.7$ | $n_2 = 1.62299$ | $\nu_2 = 58.14$ |
| $r_3 = -116.54$ | | |
| $d_3 = 0.1$ | | |
| $r_4 = 32.454$ (aspherical surface) | | |
| $d_4 = 7$ | $n_3 = 1.49216$ | $\nu_3 = 57.5$ |
| $r_5 = 154.1182$ | | |
| $d_5 = l_1$ (variable) | | |
| $r_6 = 97.862$ | | |
| $d_6 = 1$ | $n_4 = 1.6968$ | $\nu_4 = 55.52$ |
| $r_7 = 15.26$ | | |
| $d_7 = 4.5$ | | |
| $r_8 = -21.833$ | | |
| $d_8 = 1$ | $n_5 = 1.7725$ | $\nu_5 = 49.66$ |
| $r_9 = 20.759$ | | |
| $d_9 = 4.5$ | $n_6 = 1.84666$ | $\nu_6 = 23.88$ |
| $r_{10} = -299.975$ | | |
| $d_{10} = l_2$ (variable) | | |
| $r_{11} = -25.747$ | | |
| $d_{11} = 1.5$ | $n_7 = 1.49216$ | $\nu_7 = 57.5$ |

-continued

| | | |
|---|---|---|
| $r_{12} = 567.2072$ | | |
| $d_{12} = l_3$ (variable) | | |
| $r_{13} = -183$ | | |
| $d_{13} = 3$ | $n_8 = 1.62041$ | $\nu_8 = 60.27$ |
| $r_{14} = -34.708$ | | |
| $d_{14} = 0.1$ | | |
| $r_{15} = 197.059$ | | |
| $d_{15} = 4$ | $n_9 = 1.617$ | $\nu_9 = 62.79$ |
| $r_{16} = -47.202$ | | |
| $d_{16} = 4$ | | |
| $r_{17} = 150.0626$ | | |
| $d_{17} = 3.54$ | $n_{10} = 1.49216$ | $\nu_{10} = 57.5$ |
| $r_{18} = -93.0622$ | | |
| $d_{18} = 0.1$ | | |
| $r_{19} = 16.0266$ (aspherical surface) | | |
| $d_{19} = 6.5$ | $n_{11} = 1.49216$ | $\nu_{11} = 57.5$ |
| $r_{20} = \infty$ | | |
| $d_{20} = 1.04$ | | |
| $r_{21} = -242.654$ | | |
| $d_{21} = 2.09$ | $n_{12} = 1.84666$ | $\nu_{12} = 23.88$ |
| $r_{22} = 28.103$ | | |
| $d_{22} = 6.36$ | | |
| $r_{23} = 28.457$ | | |
| $d_{23} = 2.8$ | $n_{13} = 1.80610$ | $\nu_{13} = 40.95$ |
| $r_{24} = 56.333$ | | |
| $d_{24} = 1.78$ | | |
| $r_{25} = 16.743$ | | |
| $d_{25} = 2$ | $n_{14} = 1.80518$ | $\nu_{14} = 25.43$ |
| $r_{26} = 10.169$ | | |
| $d_{26} = 9$ | | |
| $r_{27} = 15.319$ | | |
| $d_{27} = 5$ | $n_{15} = 1.617$ | $\nu_{15} = 62.79$ |
| $r_{28} = -141.112$ | | |
| $d_{28} = 0.26$ | | |
| $r_{29} = \infty$ | | |
| $d_{29} = 3.1$ | $n_{16} = 1.51633$ | $\nu_{16} = 64.15$ |
| $r_{30} = \infty$ | | |
| $d_{30} = 0.05$ | | |
| $r_{31} = \infty$ | | |
| $d_{31} = 3.4$ | $n_{17} = 1.45875$ | $\nu_{17} = 67.8$ |
| $r_{32} = \infty$ | | |

$f = 12.42 \sim 69.46$

| f | 12.42 | 30 | 69.46 |
|---|---|---|---|
| $l_1$ | 0.780 | 17.167 | 26.562 |
| $l_2$ | 28.387 | 8.731 | 4.199 |
| $l_3$ | 2.842 | 6.112 | 1.248 | coefficient of aspherical surface
p = 0.7004 (fourth surface)
$C_{4,4} = 0.17479 \times 10^{-5}$, $C_{4,6} = -0.1049 \times 10^{-7}$
$C_{4,8} = 0.52281 \times 10^{-10}$, $C_{4,10} = -0.11883 \times 10^{-12}$
$C_{4,12} = 0.13471 \times 10^{-15}$, $C_{4,14} = -0.84657 \times 10^{-19}$
$C_{4,16} = 0.52212 \times 10^{-22}$
p = 0.8792 (nineteenth surface)

In embodiments shown in the above, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

Figure 2:
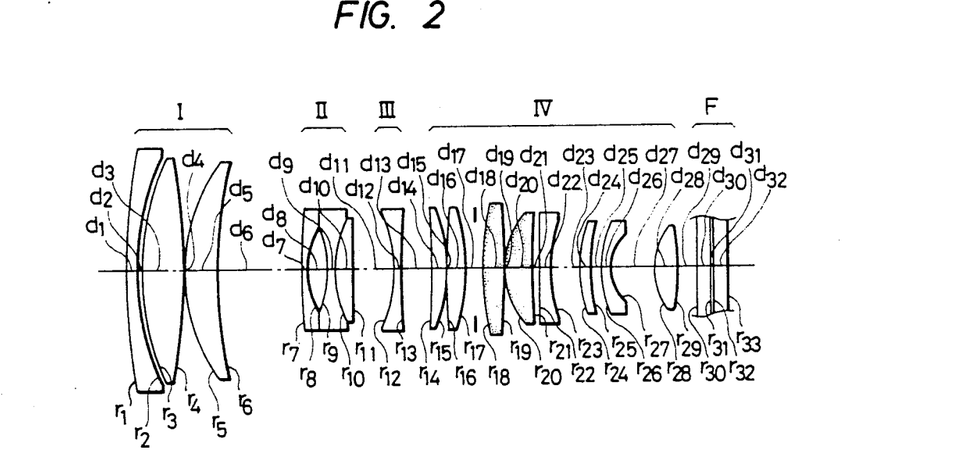
FIGS. 2 through 4 respectively show sectional views of Embodiments 1 through 3 of the zoom lens system according to the present invention.

Embodiment 1 is a zoom lens system with the lens configuration shown in FIG. 2. That is, the first lens group I comprises a first and second lens components, wherein the first lens component comprises a negative lens and a positive lens arranged with a small airspace between them and the second lens component is a positive lens, the second lens group II comprises a third and fourth lens components, wherein the third lens component is a negative lens and the fourth lens component is a cemented doublet consisting of a negative lens and a positive lens, the third lens group III comprises a fifth lens component which is a negative lens, and the fourth lens group IV comprises a sixth, seventh eighth, ninth, tenth, eleventh, twelfth and thirteenth lens components, wherein the sixth, seventh, eighth and ninth lens components are positive lenses respectively, the tenth lens component is a negative lens, the eleventh lens component is a positive lens, the twelfth lens component is a negative lens, and the thirteenth lens component is a positive lens. Reference symbol F in FIG. 2 represents a filter. Embodiment 1 employs plastic lenses in the fourth lens group IV. That is, out of lens components constituting the fourth lens group IV, the eighth and the ninth lens components are arranged as plastic lenses. Besides, the surface on the object side of the ninth lens component, which is a plastic lens, is formed as an aspherical surface.

Embodiment 1 is composed as a lens system which is generally called an afocal zoom lens system, i.e., it is so arranged that paraxial rays become approximately parallel with the optical axis at the position of a stop located between the seventh and eighth lens components, and parallel rays are converged by the relay lens arranged in rear of the stop. The relay lens of an afocal zoom lens system has an F-number and image height which are equal to the F-number and image height of the zoom lens system. Therefore, in case of a zoom lens system with F/1.4 and image height 5.5 mm like this embodiment, considerably high performance is required for the relay lens.

When it is attempted to compose said relay lens so that it has high performance and is compact in size, refractive powers of respective lenses become strong, radii of curvature of respective lens surfaces become small, and it is not easy to manufacture the lenses.

Besides, as a lens with very strong refractive power tends to cause aberrations, it is necessary to use a glass material with high refractive index or to adopt an aspherical surface. However, glass materials with high refractive indices are too hard or too soft, and it is not easy to grind and polish them. Moreover, the mechanical strength is unfavourable. Therefore, they are contrary to the object of the present invention to provide a zoom lens system of low price.

On the other hand, forming of an aspherical surface using a glass material is considerably difficult. This means that the cost of manufacture becomes high, and it is contrary to the object of the present invention.

When an aspherical surface is adopted for a lens element, it is possible to prevent aberrations other than chromatic aberration from occurring by selecting an adequate shape of aspherical surface, even when the refractive power is centralized upon said lens element so as to make its refractive power strong.

The fourth lens group IV of Embodiment 1 is arranged that the focal length $f_9$ of the ninth lens component is $f_9 = 32.564$ while the focal length $f_R$ of the relay lens is $f_R = 35$. In other words, the refractive power of the ninth lens component is made strong. Generally, it is effective when a lens element with a focal length $f_e$ about $0.5 < f_e/f_R < 2$ is arranged as an aspherical lens. Therefore, also in this embodiment, the ninth lens component is arranged as an aspherical lens. As described in the above, the fourth lens group IV of Embodiment 1 is arranged that the refractive power is centralized upon a partial lens element (the ninth lens component) and, consequently, refractive powers of the other lens elements become weak. Therefore, it is possible to arrange a spherical lens made of plastic among the lens elements with weakened refractive powers and, as a result, it is possible to make the lens system still lower in price.

Besides, the fourth lens group IV of Embodiment 1 is arranged that the stop is located between the seventh and eighth lens components, and the overall length of the lens system is approximately the same as those of known zoom lens systems. However, this embodiment is arranged as a telecentric system with a short back focal length. A short back focal length is advantageous for making the camera as a whole compact.

To make the back focal length short, heights of paraxial rays should be sharply made low by the lens elements arranged in the front part in the fourth lens group IV. In Embodiment 1, a surface with a strong negative power is adopted for the surface $r_{23}$ on the image side of the tenth lens component which is the final surface of respective lens components (the eighth through the tenth lens components) arranged in the front part in the relay lens, and the heights of paraxial rays are sharply decreased by the surfaces located in front of the surface $r_{23}$.

The total focal length $f_{8910}$ of the above-mentioned three lens components is $f_{8910} = 71.865$ mm while the focal lengths of these lens components are $f_8 = 117.274$, $f_9 = 32.564$ and $f_{10} = -29.643$ respectively. In other words, most of positive refractive power is centralized upon the positive lens in the middle (the ninth lens component) and, espectially, the surface $r_{20}$ on the object side thereof is arranged to have a strong refractive power. Besides, in spite of the fact that a plastic lens with a low refractive index is adopted for the ninth lens component with a strong refractive power, spherical aberration is prevented from occurring by arranging the surface $r_{20}$ as an ellipsoid of revolution, i.e., by arranging p in the formula of aspherical surface as $p < 1$.

Moreover, as a negative lens (the tenth lens component) is arranged in a position near the two positive lenses (the eighth and ninth lens components) out of the above-mentioned three lens components, positive spherical aberration is caused at said negative lens. Therefore, to eliminate longitudinal chromatic aberration, it is necessary to reserve negative spherical aberration which offsets the above-mentioned positive chromatic aberration. For this purpose, the above-mentioned aspherical surface is formed as a surface expressed by the formula of aspherical surface wherein $0.5 < p$.

To arrange the relay lens as a telecentric system, the front focal point of the relay lens comes to the position of the stop. For this purpose, lens components with comparatively strong refractive powers should be arranged in the rear part in the fourth lens group IV so that the front focal point of the fourth lens group IV comes approximately to the position of the stop. In Embodiment 1, the eleventh through the thirteenth lens components correspond to the above-mentioned lens components with comparatively strong refractive powers.

At these lens components (the eleventh through the thirteenth lens components), heights of paraxial rays are low and heights of offaxial rays are high. In other words, these lens components have actions inverse to those of the eighth through the tenth lens components. Moreover, as the eighth through the tenth lens components and the eleventh through the thirteenth lens components are arranged at a comparatively long distance from each other, their aberrations should be corrected independently of each other. Therefore, the eleventh through the thirteenth lens components are arranged in the triplet type of positive, negative and positive lenses in order to correct coma and distortion and, at the same time, to eliminate lateral chromatic aberration.

Figure 3:
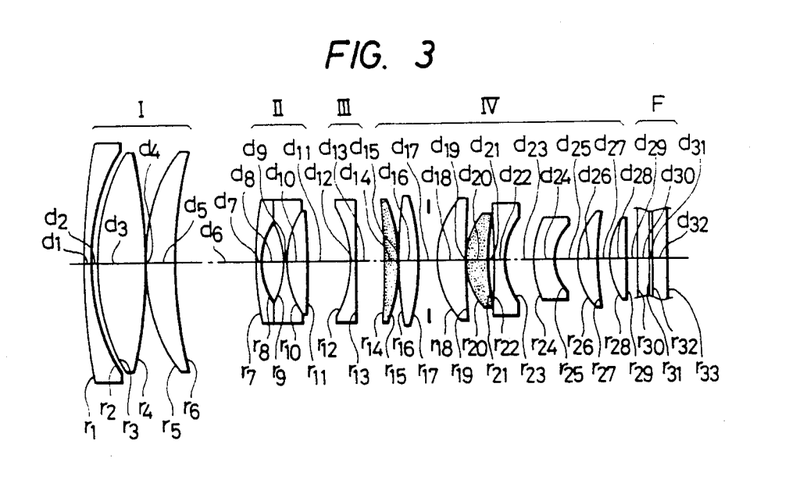

Embodiment 2 is a zoom lens system with the lens configuration shown in FIG. 3. In this embodiments, the composition especially of the relay lens is somewhat different from that of Embodiment 1. Besides, lens components arranged as plastic lenses are different from those of Embodiment 1. That is, in Embodiment 2, the sixth and ninth lens components in the fourth lens group IV are arranged as plastic lenses. As powers of these lens components are weak, aspherical surfaces are not adopted for them.

The relay lens located in rear of the stop is composed in such type that each lens constituting a triplet is divided into two lenses. that is, out of a positive lens, negative lens and positive lens constituting a triplet, the positive lens on the object side is divided into two lenses, i.e., the eighth and ninth lens components, the negative lens in the middle is divided into two lenses, i.e., the tenth and eleventh lens components, and the positive lens on the image side is divided into two lenses, i.e., the twelfth and thirteenth lens components. Out of the two negative lenses among them, the lens on the stop side (the tenth lens component) is arranged in a position near the positive lens (the ninth lens component), which is located just in front of said lens, in order to eliminate longitudinal chromatic aberration. Besides, to eliminate longitudinal chromatic aberration, the following condition should be fulfilled.

$$\frac{\nu_8 + \nu_9 + \nu_{10} + \nu_{11}}{4} - \nu_{12} > 30$$

If this condition is not fulfilled and Abbe's number becomes large, it is impossible to obtain suitable materials for the lenses.

In Embodiment 2, heights of rays are sharply decreased by the surface just in rear of the stop (surface on the object side of the eighth lens component) in the fourth lens group IV, and the back focal length is thereby made very short. However, as a lens material with high refractive index is used for the eighth lens component, the surface on the object side thereof is not arranged as an aspherical surface.

Figure 4:
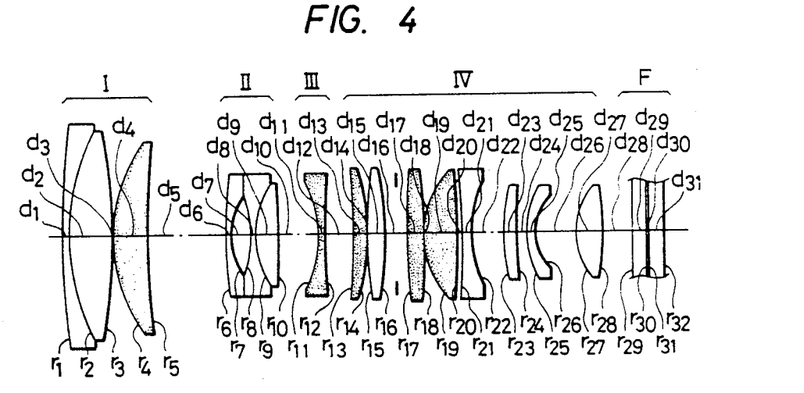
Figure 5:
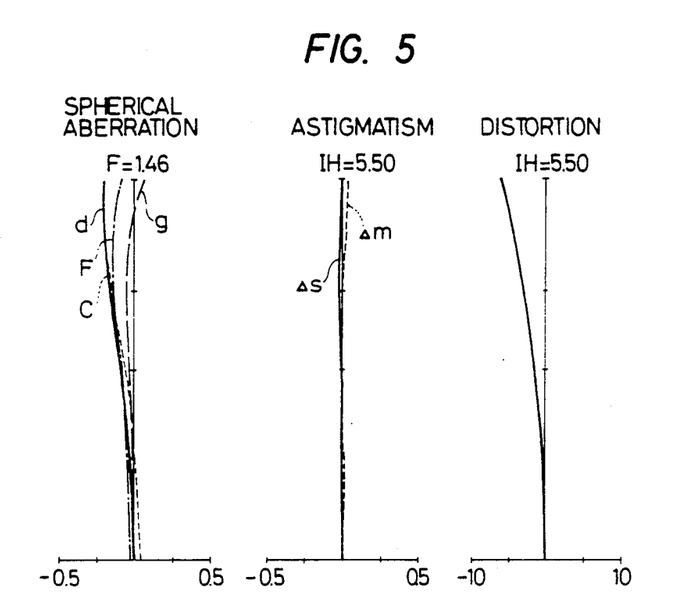
FIGS. 5 through 7 respectively show graphs illustrating aberration curves of Embodiment 1 in the wide position, standard position and teleposition.
Figure 6:
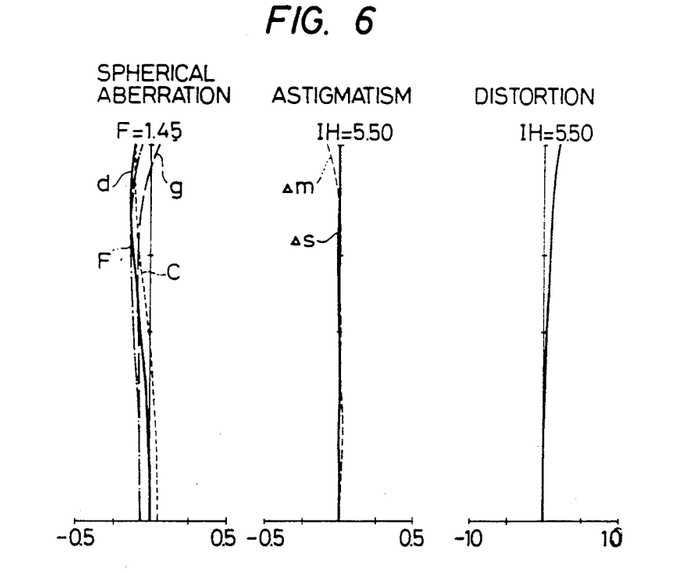
Figure 7:
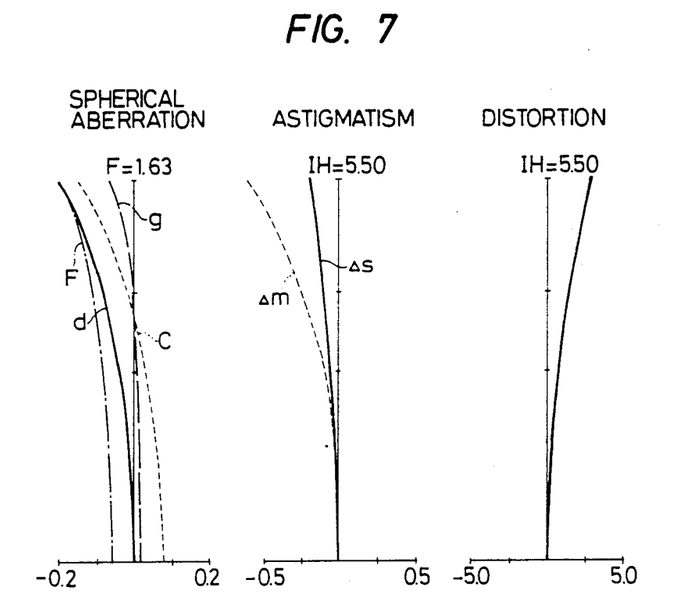
Figure 8:
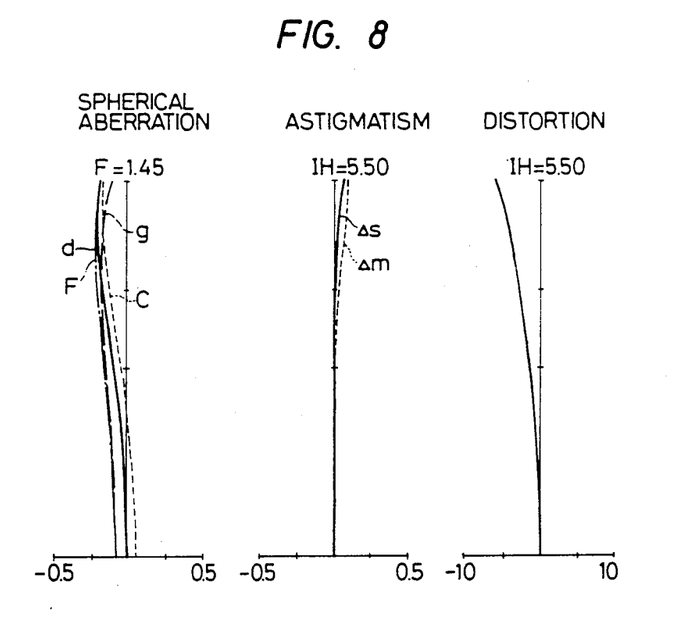
FIGS. 8 through 10 respectively show graphs illustrating aberration curves of Embodiment 2 in the wide position, standard position and teleposition.
Figure 9:
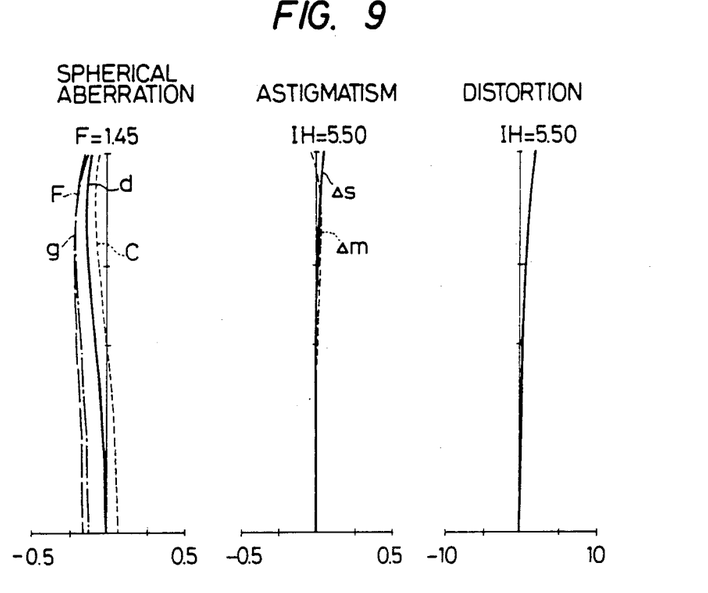
Figure 10:
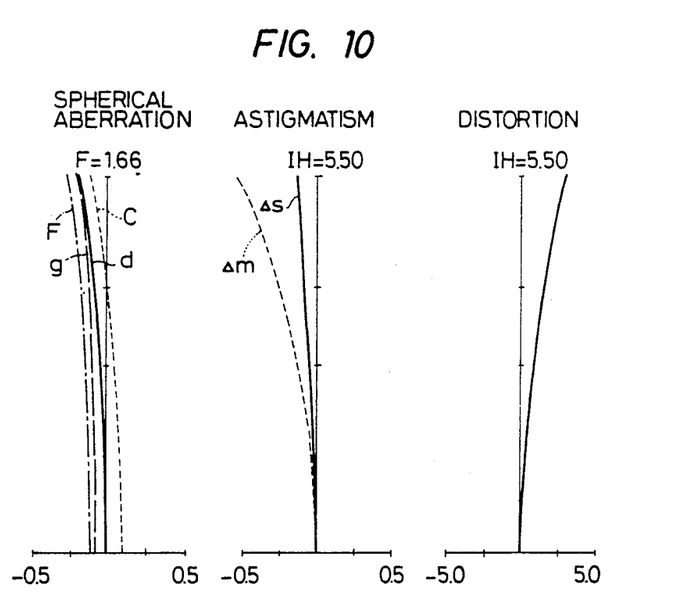
Figure 11:
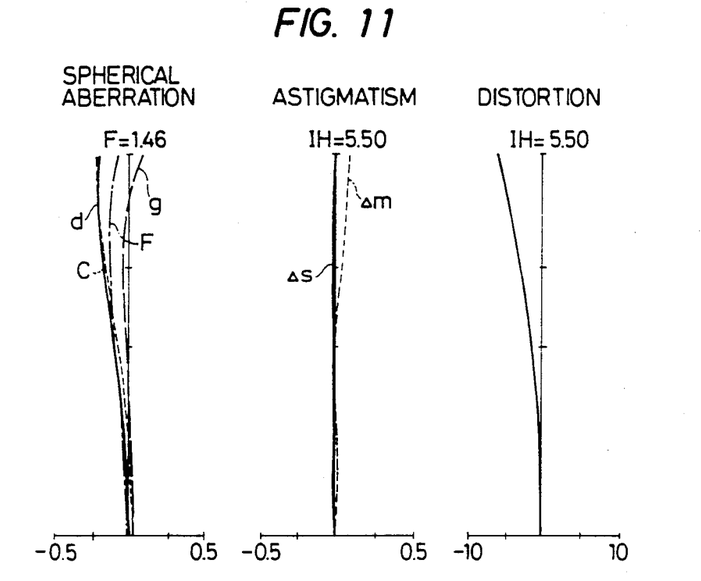
FIGS. 11 through 13 respectively show graphs illustrating aberration curves of Embodiment 3 in the wide position, standard position and teleposition.
Figure 12:
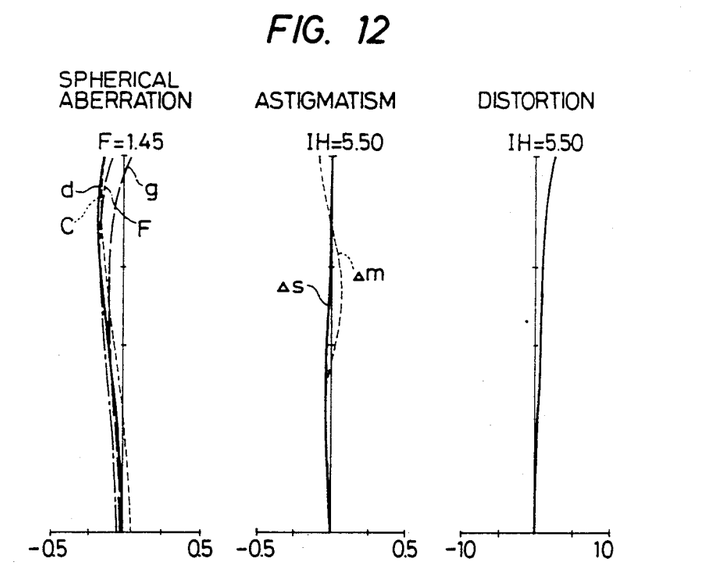
Figure 13:
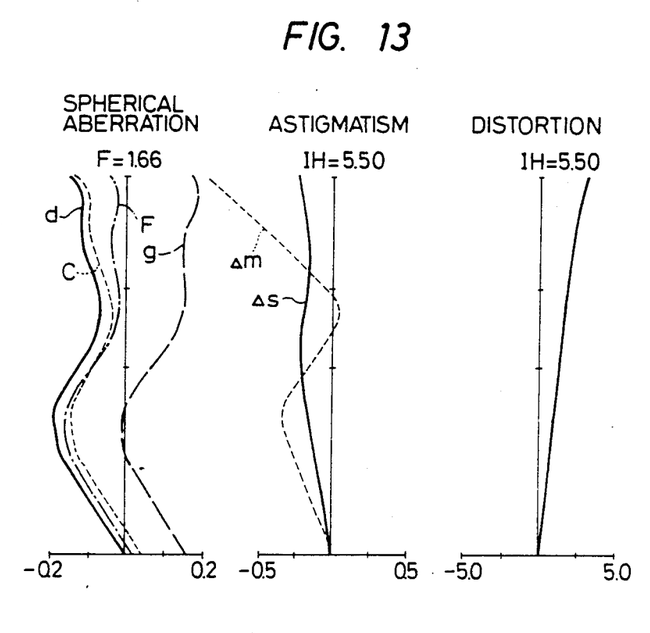

Embodiment 3 has the lens configuration shown in FIG. 4 and plastic lenss are used in the first, third and fourth lens groups respectively. That is, the second, fifth, sixth, eighth and ninth lens components are respectively arranged as plastic lenses. As described in the above, plastic lenses are adopted in all lens groups except the second lens group II.

The fourth lens group IV of Embodiment 3 has the lens configuration similar to that of Embodiment 1.

In Embodiment 3, the surface on the object side of the second lens component, which is a plastic lens, in the first lens group I is arranged as an aspherical surface. When this aspherical surface is formed as a simple ellipsoid of revolution, coma of lower rays on the long focal length side will be undercorrected, and this is not desirable. Therefore, in Embodiment 3, the above-mentioned surface is formed as such aspherical surface that the amount of deviation thereof from the reference spherical surface at first becomes positive as the height h from the optical axis becomes larger and, then, becomes negative. In case of a simple ellipsoid of revolution, said amount of deviation becomes positive starting from the optical axis and increases monotonously as the height h becomes larger.

As the above-mentioned aspherical surface is adopted, coma of lower rays on the long focal length side is perfectly prevented from becoming a large negative value.

As described so far, the present invention provides a zoom lens system which is light in weight and low in price by adopting plastic lenses not only in the first lens group I but also in the third lens group III and fourth lens group IV. Moreover, by adopting an aspherical surface or aspherical surfaces as required, the present invention enables to improve the performance of the lens system and to arrange more lens elements as plastic lenses. Besides, in spite of the light weight and low price, the the lens system provided by the present invention is an excellent zoom lens system of which the aperture ratio is large, i.e., F/1.4, and the distance from the front end of the lens system to the image surface is short.

I claim:

1. A zoom lens system comprising a first lens group having positive refractive power, a second lens group having negative refractive power, a third lens group having negative refractive power, and a fourth lens group having positive refractive power, said fourth lens group consisting of a front sub-group consisting of two positive lenses, a middle sub-group consisting of two positive lenses and a negative lens, and a rear sub-group consisting of a negative lens and two positive lenses, said zoom lens system being arranged to be zoomed by moving said second and third lens groups, at least one element in said fourth lens group being arranged as a plastic lens with at least one lens surface being arranged as an aspherical surface.

2. A zoom lens system according to claim 1, in which said aspherical surface is arranged as a surface convex toward the object side and is expressed approximately by the formula shown below where the optical axis is represented by x axis, axis vertical to the optical axis is represented by y axis, coefficient of cone is represented by reference symbol p, and radius of curvature of the vertex portion of said aspherical surface is represented by reference symbol r.

$$x_h = \frac{\frac{h^2}{r}}{1 + \sqrt{1 - p\frac{h^2}{r^2}}}$$

$$0.5 < p \leq 1$$

3. A zoom lens system according to claim 1, in which said aspherical surface is arranged as a surface convex toward the image side and is expressed approximately by the formula shown below where the optical axis is represented by x axis, axis vertical to the optical axis is represented by y axis, coefficient of cone is represented by reference symbol p, and radius of curvature of the vertex portion of said aspherical surface is represented by reference symbol r.

$$x_h = \frac{\frac{h^2}{r}}{1 + \sqrt{1 - p\frac{h^2}{r^2}}}$$

-continued $$1 \leq p < 2$$

4. A zoom lens system according to claim 1, in which at least one lens element in said third lens group is further arranged as a plastic lens.

5. A zoom lens system according to claim 2, in which at least one lens element in said third lens group is further arranged as a plastic lens.

6. A zoom lens system according to claim 3, in which at least one lens element in said third lens group is further arranged as a plastic lens.

7. A zoom lens system according to claim 1, in which at least one lens element in said first lens group is further arranged as a plastic lens.

8. A zoom lens system according to claim 2, in which at least one lens element in said first lens group is further arranged as a plastic lens.

9. A zoom lens system according to claim 3, in which at least one lens element in said first lens group is further arranged as a plastic lens.

10. A zoom lens system according to claim 4, in which at least one lens element in said first lens group is further arranged as a plastic lens.

11. A zoom lens system according to claim 2, in which said first lens group comprises a first and second lens components, wherein said first lens component comprises a negative lens and a positive lens and said second lens component is a positive lens, said second lens group comprises a third and fourth lens components, wherein said third lens component is a negative lens and said fourth lens component is a cemented doublet consisting of a negative lens and a positive lens, said third lens group comprises a fifth lens component arranged as a negative lens, said fourth lens group comprises a sixth, seventh, eighth, ninth, tenth, eleventh, twelfth and thirteenth lens components, wherein said sixth, seventh, eighth and ninth lens components are positive lenses respectively, said tenth lens component is a negative lens, said eleventh lens component is a positive lens, said twelfth lens component is a negative lens, and said thirteenth lens component is a positive lens, said eighth and ninth lens components being respectively arranged as plastic lenses, the surface on the object side of said ninth lens component being arranged as an aspherical surface.

12. A zoom lens system according to claim 11, in which said zoom lens system has the following numerical data:

$r_1 = 163.4077$
$d_1 = 1.5$   $n_1 = 1.78472$   $\nu_1 = 25.68$
$r_2 = 48.4737$
$d_2 = 1$
$r_3 = 49.3624$
$d_3 = 9.3$   $n_2 = 1.62041$   $\nu_2 = 60.27$
$r_4 = -111.7425$
$d_4 = 0.1$
$r_5 = 36.1884$
$d_5 = 6.4$   $n_3 = 1.6968$   $\nu_3 = 55.52$
$r_6 = 82.5047$
$d_6 = l_1$ (variable)
$r_7 = 97.862$
$d_7 = 1$   $n_4 = 1.6968$   $\nu_4 = 55.52$
$r_8 = 15.26$
$d_8 = 4.5$
$r_9 = -21.833$
$d_9 = 1$   $n_5 = 1.7725$   $\nu_5 = 49.66$
$r_{10} = 20.759$
$d_{10} = 4.5$   $n_6 = 1.84666$   $\nu_6 = 23.88$ -continued $r_{11} = -299.975$
$d_{11} = l_2$ (variable)
$r_{12} = -31.021$
$d_{12} = 1.5$   $n_7 = 1.62041$   $\nu_7 = 60.27$
$r_{13} = \infty$
$d_{13} = l_3$ (variable)
$r_{14} = -183$
$d_{14} = 3$   $n_8 = 1.62041$   $\nu_8 = 60.27$
$r_{15} = -34.708$
$d_{15} = 0.1$
$r_{16} = 197.059$
$d_{16} = 4$   $n_9 = 1.617$   $\nu_9 = 62.79$
$r_{17} = -47.202$
$d_{17} = 4$
$r_{18} = 150.0626$
$d_{18} = 3.54$   $n_{10} = 1.49216$   $\nu_{10} = 57.5$
$r_{19} = -93.0622$
$d_{19} = 0.1$
$r_{20} = 16.0266$ (aspherical surface)
$d_{20} = 6.5$   $n_{11} = 1.49216$   $\nu_{11} = 57.5$
$r_{21} = \infty$
$d_{21} = 1.04$
$r_{22} = -242.654$
$d_{22} = 2.09$   $n_{12} = 1.84666$   $\nu_{12} = 23.88$
$r_{23} = 28.103$
$d_{23} = 6.36$
$r_{24} = 28.457$
$d_{24} = 2.8$   $n_{13} = 1.80610$   $\nu_{13} = 40.95$
$r_{25} = 56.333$
$d_{25} = 1.78$
$r_{26} = 16.743$
$d_{26} = 2$   $n_{14} = 1.80518$   $\nu_{14} = 25.43$
$r_{27} = 10.169$
$d_{27} = 9$
$r_{28} = 15.319$
$d_{28} = 5$   $n_{15} = 1.617$   $\nu_{15} = 62.79$
$r_{29} = -141.112$
$f = 12.42 \sim 69.46$

| f | 12.42 | 30 | 69.46 |
|---|---|---|---|
| $l_1$ | 1.353 | 17.740 | 27.135 |
| $l_2$ | 28.431 | 8.774 | 4.242 |
| $l_3$ | 2.877 | 6.147 | 1.284 |

$p = 0.8792$ (twentieth surface)

where, reference symbols $r_1$, $r_2$, . . . respectively represent radii of curvature of respective lens surfaces, reference symbols $d_1$, $d_2$, . . . respectively represent thicknesses of respective lenses and airspaces between respective lenses, reference symbols $n_1$, $n_2$, . . . respectively represent refractive indices of respective lenses, and reference symbols $\nu_1$, $\nu_2$, . . . respectively represent Abbe's numbers of respective lenses.

13. A zoom lens system according to claim 1, in which said first lens group comprises a first and second lens components, wherein said first lens component comprises a negative lens and a positive lens and said second lens component is a positive lens, said second lens group comprises a third and fourth lens components, wherein said third lens component is a negative lens and said fourth lens component is a cemented doublet consisting of a negative lens and a positive lens, said third lens group comprises a fifth lens component arrnged as a negative lens, said fourth lens goup comprises a sixth, seventh, eighth, ninth, tenth, eleventh, twelfth and thirteenth lens components, wherein said sixth, seventh, eighth and ninth lens components are positive lenses respectively, said tenth lens component is a negative lens, said eleventh lens component is a negative lens, said twelfth lens component is a positive lens, and said thirteenth lens component is a positive lens, said sixth and ninth lens components being respectively arranged as plastic lenses.

14. A zoom lens system according to claim 13, in which said zoom lens system has the following numerical data:

| | | | |
|---|---|---|---|
| $r_1 = 163.4077$ | | | |
| | $d_1 = 1.5$ | $n_1 = 1.78472$ | $\nu_1 = 25.68$ |
| $r_2 = 48.4737$ | | | |
| | $d_2 = 1$ | | |
| $r_3 = 49.3624$ | | | |
| | $d_3 = 9.3$ | $n_2 = 1.62041$ | $\nu_2 = 60.27$ |
| $r_4 = -111.7425$ | | | |
| | $d_4 = 0.1$ | | |
| $r_5 = 36.1884$ | | | |
| | $d_5 = 6.4$ | $n_3 = 1.6968$ | $\nu_3 = 55.52$ |
| $r_6 = 82.5047$ | | | |
| | $d_6 = l_1$ (variable) | | |
| $r_7 = 97.862$ | | | |
| | $d_7 = 1$ | $n_4 = 1.6968$ | $\nu_4 = 55.52$ |
| $r_8 = 15.26$ | | | |
| | $d_8 = 4.5$ | | |
| $r_9 = -21.833$ | | | |
| | $d_9 = 1$ | $n_5 = 1.7725$ | $\nu_5 = 49.66$ |
| $r_{10} = 20.759$ | | | |
| | $d_{10} = 4.5$ | $n_6 = 1.84666$ | $\nu_6 = 23.88$ |
| $r_{11} = -299.975$ | | | |
| | $d_{11} = l_2$ (variable) | | |
| $r_{12} = -31.021$ | | | |
| | $d_{12} = 1.5$ | $n_7 = 1.62041$ | $\nu_7 = 60.27$ |
| $r_{13} = \infty$ | | | |
| | $d_{13} = l_3$ (variable) | | |
| $r_{14} = -217.555$ | | | |
| | $d_{14} = 3$ | $n_8 = 1.49216$ | $\nu_8 = 57.5$ |
| $r_{15} = -29.1151$ | | | |
| | $d_{15} = 0.1$ | | |
| $r_{16} = 114.5486$ | | | |
| | $d_{16} = 4$ | $n_9 = 1.497$ | $\nu_9 = 81.61$ |
| $r_{17} = -42.1253$ | | | |
| | $d_{17} = 4$ | | |
| $r_{18} = 19.1046$ | | | |
| | $d_{18} = 6.2$ | $n_{10} = 1.6968$ | $\nu_{10} = 56.49$ |
| $r_{19} = 327.6174$ | | | |
| | $d_{19} = 0.1$ | | |
| $r_{20} = 16.0450$ | | | |
| | $d_{20} = 4$ | $n_{11} = 1.49216$ | $\nu_{11} = 57.5$ |
| $r_{21} = 32.1306$ | | | |
| | $d_{21} = 1.47$ | | |
| $r_{22} = -218.0205$ | | | |
| | $d_{22} = 2.09$ | $n_{12} = 1.80518$ | $\nu_{12} = 25.43$ |
| $r_{23} = 13.4794$ | | | |
| | $d_{23} = 6.58$ | | |
| $r_{24} = 17.3486$ | | | |
| | $d_{24} = 4.08$ | $n_{13} = 1.80518$ | $\nu_{13} = 25.43$ |
| $r_{25} = 10.7330$ | | | |
| | $d_{25} = 4.97$ | | |
| $r_{26} = 15.5448$ | | | |
| | $d_{26} = 4$ | $n_{14} = 1.62041$ | $\nu_{14} = 60.27$ |
| $r_{27} = 71.52$ | | | |
| | $d_{27} = 2.34$ | | |
| $r_{28} = 15.5188$ | | | |
| | $d_{28} = 3.7$ | $n_{15} = 1.62041$ | $\nu_{15} = 60.27$ |
| $r_{29} = 283.9027$ | | | |
| $f = 12.42 \sim 69.46$ | | | |
| f | 12.42 | 30 | 69.46 |
| $l_1$ | 1.353 | 17.740 | 27.135 |
| $l_2$ | 28.431 | 8.774 | 4.242 |
| $l_3$ | 2.797 | 6.067 | 1.203 | where, reference symbols $r_1$, $r_2$, . . . respectively represent radii of curvature of respective lens surfaces, reference symbols $d_1$, $d_2$, . . . respectively represent thicknesses of respective lenses and airspaces between respective lenses, reference symbols $n_1$, $n_2$, . . . respectively represent refractive indices of respective lenses, and reference symbols $\nu_1$, $\nu_2$, . . . respectively represent Abbe's numbers of respective lenses.

15. A zoom lens system according to claim 2, in which said first lens group comprises a first and second lens components, wherein said first lens component is a cemented doublet consisting of a negative lens and a positive lens and said second lens component is a positive lens, said second lens group comprises a third and fourth lens components, wherein said third lens component is a negative lens and said fourth lens component is a cemented doublet consisting of a negative lens and a positive lens, said third lens group comprises a fifth lens component arranged as a negative lens, said fourth lens group comprises a sixth, seventh, eighth, ninth, tenth, eleventh, twelfth and thirteenth lens components, wherein said sixth, seventh, eighth and ninth lens components are positive lenses respectively, said tenth lens component is a negative lens, said eleventh lens component is a positive lens, said twelfth lens component is a negative lens, and said thirteenth lens component is a positive lens, said second, fifth, sixth, eighth and ninth lens components being respectively arranged as plastic lenses, the surface on the object side of said second lens component and the surface on the object side of said ninth lens components being respectively arranged as aspherical surfaces.

16. A zoom lens system according to claim 15, in which said zoom lens system has the following numerical data:

| | | | |
|---|---|---|---|
| $r_1 = 175.465$ | | | |
| | $d_1 = 1.5$ | $n_1 = 1.78472$ | $\nu_1 = 25.68$ |
| $r_2 = 47.104$ | | | |
| | $d_2 = 8.7$ | $n_2 = 1.62299$ | $\nu_2 = 58.14$ |
| $r_3 = -116.54$ | | | |
| | $d_3 = 0.1$ | | |
| $r_4 = 32.454$ (aspherical surface) | | | |
| | $d_4 = 7$ | $n_3 = 1.49216$ | $\nu_3 = 57.5$ |
| $r_5 = 154.1182$ | | | |
| | $d_5 = l_1$ (variable) | | |
| $r_6 = 97.862$ | | | |
| | $d_6 = 1$ | $n_4 = 1.6968$ | $\nu_4 = 55.52$ |
| $r_7 = 15.26$ | | | |
| | $d_7 = 4.5$ | | |
| $r_8 = -21.833$ | | | |
| | $d_8 = 1$ | $n_5 = 1.7725$ | $\nu_5 = 49.66$ |
| $r_9 = 20.759$ | | | |
| | $d_9 = 4.5$ | $n_6 = 1.84666$ | $\nu_6 = 23.88$ |
| $r_{10} = -299.975$ | | | |
| | $d_{10} = l_2$ (variable) | | |
| $r_{11} = -25.747$ | | | |
| | $d_{11} = 1.5$ | $n_7 = 1.49216$ | $\nu_7 = 57.5$ |
| $r_{12} = 567.2072$ | | | |
| | $d_{12} = l_3$ (variable) | | |
| $r_{13} = -183$ | | | |
| | $d_{13} = 3$ | $n_8 = 1.62041$ | $\nu_8 = 60.27$ |
| $r_{14} = -34.708$ | | | |
| | $d_{14} = 0.1$ | | |
| $r_{15} = 197.059$ | | | |
| | $d_{15} = 4$ | $n_9 = 1.617$ | $\nu_9 = 62.79$ |
| $r_{16} = -47.202$ | | | |
| | $d_{16} = 4$ | | |
| $r_{17} = 150.0626$ | | | |
| | $d_{17} = 3.54$ | $n_{10} = 1.49216$ | $\nu_{10} = 57.5$ |
| $r_{18} = -93.0622$ | | | |
| | $d_{18} = 0.1$ | | |
| $r_{19} = 16.0266$ (aspherical surface) | | | |
| | $d_{19} = 6.5$ | $n_{11} = 1.49216$ | $\nu_{11} = 57.5$ |
| $r_{20} = \infty$ | | | |
| | $d_{20} = 1.04$ | | |
| $r_{21} = -242.654$ | | | |
| | $d_{21} = 2.09$ | $n_{12} = 1.84666$ | $\nu_{12} = 23.88$ |
| $r_{22} = 28.103$ | | | |
| | $d_{22} = 6.36$ | | |
| $r_{23} = 28.457$ | | | |
| | $d_{23} = 2.8$ | $n_{13} = 1.80610$ | $\nu_{13} = 40.95$ |
| $r_{24} = 56.333$ | | | |
| | $d_{24} = 1.78$ | | |
| $r_{25} = 16.743$ | | | |
| | $d_{25} = 2$ | $n_{14} = 1.80518$ | $\nu_{14} = 25.43$ |
| $r_{26} = 10.169$ | | | |
| | $d_{26} = 9$ | | |
| $r_{27} = 15.319$ | | | |
| | $d_{27} = 5$ | $n_{15} = 1.617$ | $\nu_{15} = 62.79$ |

-continued $r_{28} = -141.112$
$f = 12.42 \sim 69.46$

| f | 12.42 | 30 | 69.46 |
|---|---|---|---|
| $l_1$ | 0.780 | 17.167 | 26.562 |
| $l_2$ | 28.387 | 8.731 | 4.199 |
| $l_3$ | 2.842 | 6.112 | 1.248 | coefficient of aspherical surface
  p = 0.7004 (fourth surface)
  $C_{4,4} = 0.17479 \times 10^{-5}$, $C_{4,6} = -0.1049 \times 10^{-7}$
  $C_{4,8} = 0.52281 \times 10^{-10}$, $C_{4,10} = -0.11883 \times 10^{-12}$
  $C_{4,12} = 0.13471 \times 10^{-15}$, $C_{4,14} = -0.84657 \times 10^{-19}$ -continued $C_{4,16} = 0.52212 \times 10^{-22}$
  p = 0.8792 (nineteenth surface)

where, reference symbols $r_1$, $r_2$, . . . respectively represent radii of curvature of respective lens surfaces, reference symbols $d_1$, $d_2$, . . . respectively represent thicknesses of respective lenses and airspaces between respective lenses, reference symbols $n_1$, $n_2$, . . . respectively represent refractive indices of respective lenses, and reference symbols $\nu_1$, $\nu_2$, . . . respectively represent Abbe's numbers of respective lenses.

* * * * *